United States Patent [19]

Feddersen

[11] Patent Number: 4,684,012
[45] Date of Patent: Aug. 4, 1987

[54] BLOW MOLDING PALLET ASSEMBLY

[75] Inventor: Frederick J. Feddersen, Londonderry, N.H.

[73] Assignee: Fedders Machine and Tools Co., Inc., Londonderry, N.H.

[21] Appl. No.: 879,535

[22] Filed: Jun. 23, 1986

Related U.S. Application Data

[63] Continuation of Ser. No. 628,449, Jul. 6, 1984, abandoned.

[51] Int. Cl.$^4$ .............................................. B65G 47/86
[52] U.S. Cl. .......................... 198/803.01; 198/803.8; 294/99.1; 425/526
[58] Field of Search ............ 198/803.01, 803.2, 803.8, 198/803.15; 294/90, 99.1, 87.2; 425/526, 534

[56] References Cited

U.S. PATENT DOCUMENTS

| | | | |
|---|---|---|---|
| 763,174 | 6/1904 | Goebel | 198/646 X |
| 1,767,149 | 6/1930 | Marshall | 294/90 X |
| 1,934,250 | 11/1933 | Wynne et al. | 198/803.8 X |
| 2,342,333 | 2/1944 | Hallead | 198/803.8 |
| 3,267,643 | 8/1966 | Dardaine | 294/90 |
| 3,958,685 | 5/1976 | McDonald et al. | 198/179 |
| 4,185,812 | 1/1980 | Hall | 198/648 X |
| 4,351,631 | 9/1982 | Gessner et al. | 425/534 X |
| 4,362,498 | 12/1982 | Harry et al. | 425/526 |
| 4,435,146 | 3/1984 | Wiatt et al. | 425/534 |
| 4,483,436 | 11/1984 | Krishnakumar et al. | 198/648 |

OTHER PUBLICATIONS

Van Dorn Plastic Machinery Co. Catalog Pages on CIB-24 Blow Molding Machine B & G Machinery Company Catalog pages.

Primary Examiner—Robert J. Spar
Assistant Examiner—Cheryl Gastineau
Attorney, Agent, or Firm—Hayes, Davis & Soloway

[57] ABSTRACT

A pallet assembly is disclosed for use in simultaneous transfer of four preheated plastic preforms from an oven, through a blow mold where they are blown into bottles to a location where the bottles are discharged. The pallet has a base (shuttle) on which is mounted a plurality of pilot bushings for locating the pallet relative to the blow mold and other locations; four (one of each preform) preform registering means (locating and support assemblies), each to vertically locate and horizontally center each preform.

9 Claims, 6 Drawing Figures

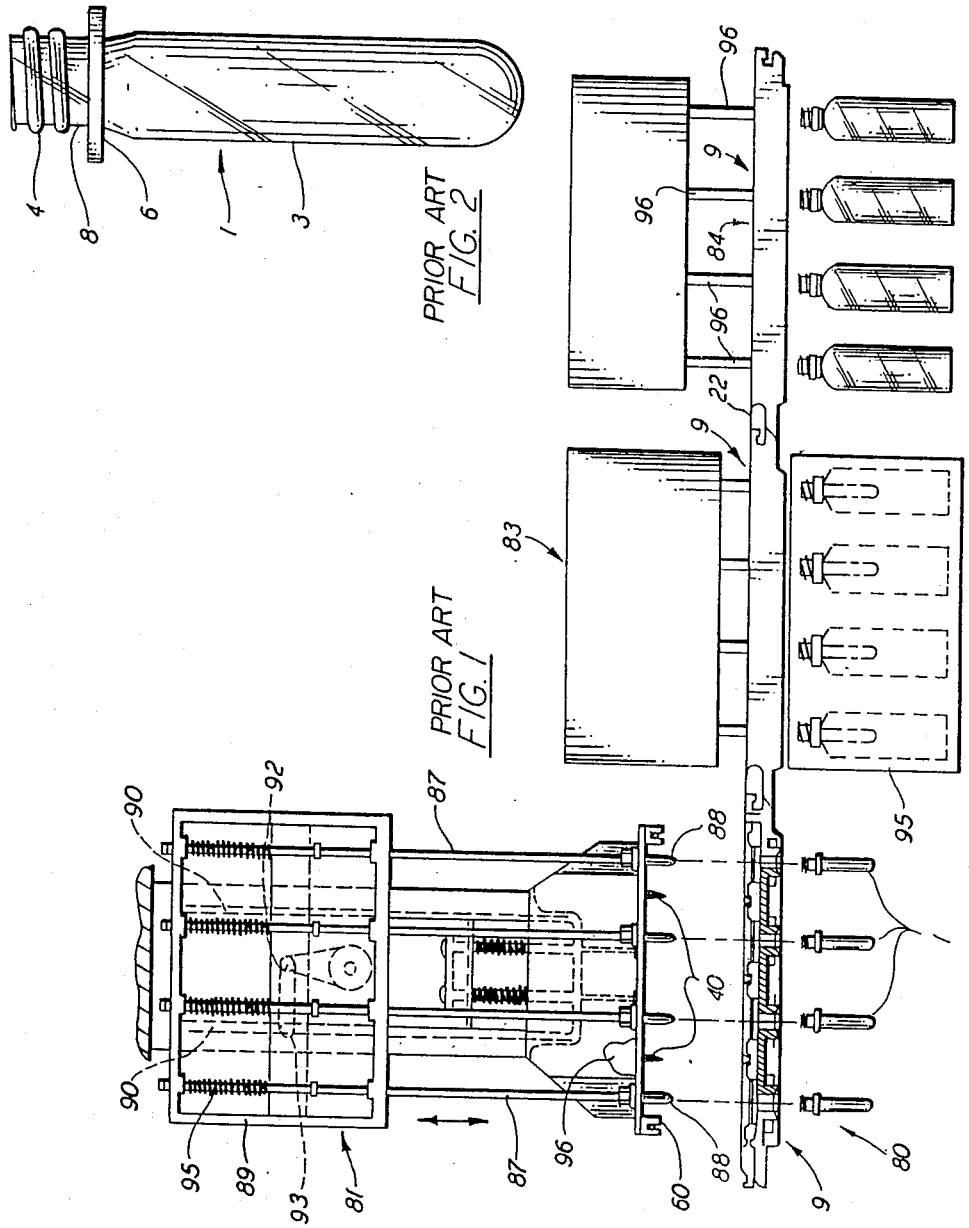

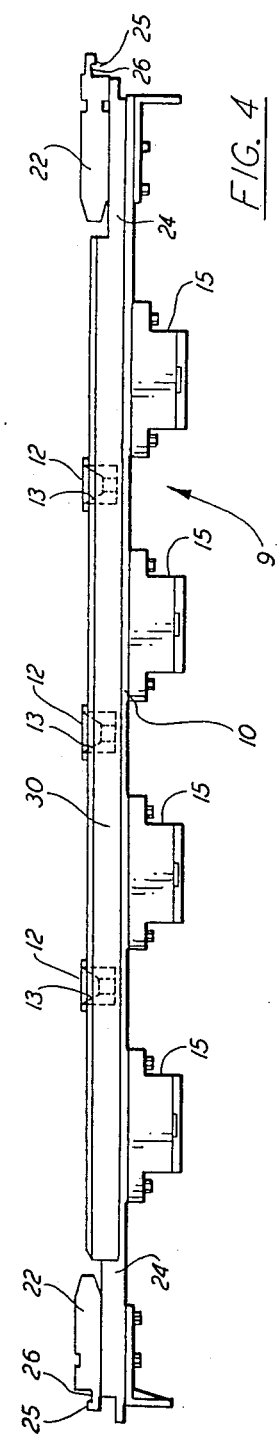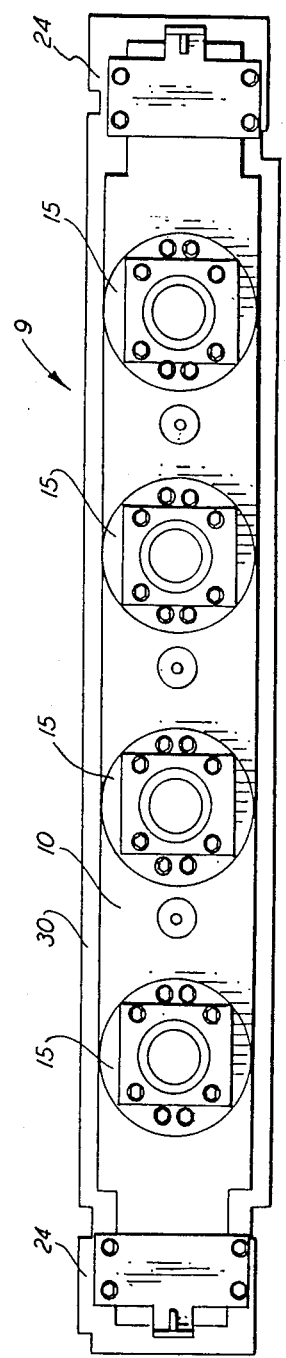

BLOW MOLDING PALLET ASSEMBLY

This is a continuation of co-pending application Ser. No. 628,449 filed July 6, 1984, now abandoned.

The present invention relates to an improvement in a pallet assembly for transferring one or more workpieces between locations during which transfer a manufacturing operation takes place. A particular, though not exclusive, aspect of the invention is a pallet assembly for transferring a plurality thermoplastic resin preforms through a blow molding operation and thereafter releasing the blown product in connection with which the present invention will be described.

Blow molding thermoplastic organic resins to form hollow containers such as bottles for beer, carbonated beverages, and the like is a known art and is the preferred use for the present invention. Suitable thermoplastic resins include resins which are biaxially orientable such as polyethylene terephthalate and polypropylene. The biaxial orientation property requires delivering the resin to the blow mold at a temperature where it can so orient, which is generally within the range between the resin softening point and the resin melting point.

The present invention is a pallet assembly and provides a means to transport an injection molded preform made of the resin from a preheating oven or other means for adjusting temperature (e.g. through a cooler from the injection mold) to the blow mold thence to a discharge point; or more broadly from one location where the means is loaded with a workpiece, through a manufacturing location such as a blow molding procedure, then to a second location for discharge.

The present invention is adapted to handle such resin for blow molding in the form of an injection molded hollow preform which in turn is shaped like a test tube that has external threads about its open end. The body of the preform has been heated to an orienting temperature but the threaded end has been kept cool, unheated because such end is not to be blown.

Commonly used apparatus for locating and supporting preforms is described and illustrated in U.S. Pat. No. 4,185,812. Such apparatus includes a pallet per se which comprises—a pallet shuttle constituting a base on which the other members of the assembly are mounted; locator means on said shuttle for positively locating said shuttle relative to adjacent machine elements; a workpiece securing and locating assembly supported on said shuttle further comprising guide means mounted on said shuttle, a pair of jaws for engaging a workpiece therebetween mounted on said guide means at least one of which jaws is reciprocably and adjustably to move between closed and open positions which respectively are the positions for securing a workpiece for and receiving or releasing a workpiece, means for biasing said jaws together, a workpiece locating member supported on said shuttle to receive and register a workpiece with reference to said shuttle to receive and register a workpiece with reference to said shuttle, said jaws being arranged to reciprocate and hold a workpiece against said locating member, and means supported on said shuttle to move the jaws apart to receive, secure, and release a workpiece.

In the preferred embodiment of this prior art, the pallet is constructed so that it can be adjusted to accommodate different sizes of preforms (workpieces), including means to adjustably mount the jaws so their spacing can be changed and removably mounting the locating member. An annular shaped ring preferably serves as the locating member and vertically locates and centers the preform.

A pair of said jaws is provided at each locating and support assembly. Each jaw has a preformed engaging end with a shallow V configuration. The other end of each jaw has a pair of elongated slots by means of which each jaw is adjustably secured to a slide by a pair of bolts in tapped holes. The slides are respectively mounted on a pair of spaced apart ways or guides which conveniently and preferably are circular in shape and fit into bushed holes on their respective sides of the pallet. The slides are biased together by a pair of helical springs in tension. In the central part of each slide is mounted a pair of stop buttons. These serve as a means to positively locate and space the guide with reference to the locating and support assemblies or a co-planar surface that is part of a shuttle.

It can be seen that the jaws can be spaced as needed by loosening the pair of bolts holding each jaw to its respective slide. When setting up the machine, locating and support assemblies of the correct size are installed then a preform of the correct size is inserted in its proper position against the locating and support assemblies while the jaws are being held loosely by their respective bolts. The jaws are biased so that their V ends engage preform and the bolts are tightened.

Actuating means comprises an assembly of levers and cranks for transmitting motion to the slides and causing the slides-jaw assemblies to move apart upon command. The command or initiating event is when a part of the blow molding machine depresses the bell cranks at the end of the shafts. When those are depressed, rotation of the shafts spreads apart the jaws against the bias of the various springs. Release of the force on the bell cranks allows the same to close. This opening and closing feature enables loading and unloading the preforms as well as detaining same in place during blow molding. There are a pair of shafts extending longitudinally of the shuttle and mounted revolvably on the shuttle at a plurality of journal bearings. At the extreme ends are bell cranks with one arm extending substantially horizontally towards the center line of the pallet. The other arm of each bell crank as well as levers located intermediately along the respective shafts engage each slide adjacent one end thereof so that there are a pair of levers (or bell crank arms) operating each slide. The bell cranks may comprise a pair of levers secured at about right angles on the shelf.

The present invention is an improvement in reheat blow molding injection molded thermoplastic preforms and provides positive and simple control of the preform upon presenting it to the blow mold.

It is an object of the present invention to provide an effective and reliable pallet assembly capable of accurately locating and supporting a preform in a desired manner using a structure, which is economical, simple and reliable, to resiliently grip the neck of the preform.

The present invention does not include the peripheral equipment such as the oven; means to transport from the oven to the pallet; pallet loading or unloading means; or the mold design. The present invention relates to a pallet per se which comprises: a pallet shuttle constituting a base on which the other members of the assembly are mounted; locator means on said shuttle for positively locating said shuttle relative to adjacent machine elements; a workpiece securing and locating assembly supported on said shuttle for securing a workpiece and for receiving or releasing a workpiece, a workpiece locating member supported on said shuttle to receive and register a workpiece with reference to said shuttle.

Other features of the invention will become apparent from the detailed description, given by way of example, when read in conjunction with the drawings, wherein:

FIG. 1 is a partially schematic side view of a prior art blow molding system in which the instant pallet assembly may be utilized;

FIG. 2 is a side view of a typical prior art injection molded preform as contemplated for use with the present invention.

FIG. 3 is a under view of the pallet assembly;

FIG. 4 is a side elevation of the pallet assembly of FIG. 3;

Figure 5:
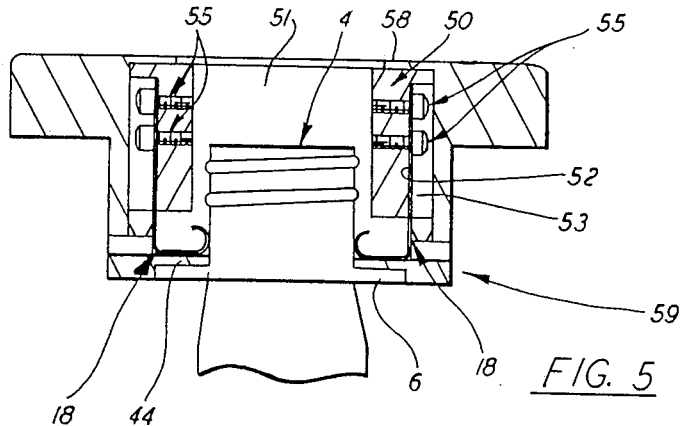
FIG. 5 is a sectional elevation of a preform locating and support assembly, four of which are attached to the pallet assembly illustrated in FIGS. 3 and 4.

The preform 1 (FIG. 2) is of injection molded thermoplastic biaxially orientable material which will so orient upon being blown in a mold at a certain temperature after release from the instant pallet. For example, polyethylene terephthalate orients in the range from about 200° F. to 250° F. It has a hollow body 3 shaped like a test tube with an externally threaded lip 4 above a support ring 6. The space 8 between the lip and ring 6 provides an annular groove by which the present pallet grips the preform and provides positive control.

The preform is not blow molded in the region of threads and rings 4, 6 hence it is not heated in such region. For this reason the preform is handled (e.g. FIG. 2) and gripped in this region until the blow molding has been accomplished.

The pallet assembly 9 (FIGS. 3, 4) has several components each of which bears further discussion: the pallet base or shuttle 10 on which the other components are mounted; locator means 12 comprises a plurality of shot pin bushings of hardened steel having a tapered hole 13 therein and a plurality of locating and support assemblies 15 for vertically locating and horizontally centering the preforms.

The pallet shuttle 10 is preferably a casting and is the base on which the other elements are mounted. The pallet 10 is machined as needed so that the other components can be fitted and supported properly on the base. The pallet connects to adjacent pallets by means of a plurality of latches 22 which are bolted in pairs on end tab 24 that are integral and extend longitudinally from the main body of the shuttle. Each of these latches has a locking head and recess 25, 26 to enable connection with mating means similarly shaped on an adjacent shuttle as illustrated in FIG. 1. To accomplish this with a minimum diversity of parts, all of the latches are made alike and they are mounted with the recess facing down at one end (to the right in FIG. 4) and mounted with the recess facing up (left in FIG. 4). The way that the latches work is to move additional shuttle assemblies perpendicular to the plane of the platen as viewed in FIG. 1 thereby to cause the latchhead and recess on adjacent units to engage. A similar motion perpendicular to the plane of the paper disengages. Engagement and disengagement is achieved without the use of moving latch parts.

Viewed in longitudinal cross-section, the shuttle 10 resembles an H beam with a series of bosses and apertures. The the beam are preferably shaped to form rails 30 for flanges of engagement with supporting structure or pallets as the case may be. One side of the shuttle has a longitudinal slot into which is fitted a female bearing member having a groove. Preferably the bearing member is made of fabric that is impregnated with a thermoset resin such as phenol formaldehyde resin. The bearing member likewise has a groove in it for engagement with adjacent machine elements such as a rail on pallets or the table or other member which supports the pallets.

The other flange of the shuttle or base contains a male bearing member in the form of a projecting rail that extends longitudinally of the entire shuttle. Preferably, this male member is of a size or profile that it could sit into the groove formed in the bearings should it be desired to next pallets longitudinally next to each other.

The locator means 12 are a plurality of bushings having a tapered hole 13 therein. These means are to permit positive location of the pallet relative to adjacent machines by the insertion of a mating shot pin into the tapered hole as discussed elsewhere with reference to FIG. 1. Positive location requires at least two of these locator means but three are shown in the preferred construction. The bushing 12 is secured to the web of the shuttle by a pair of bolts. The bushings should all be located on the center line of the locating and support assemblies 15.

The locating and support assemblies 15 are for vertically locating and horizontally centering the preforms by providing an internal shoulder 44 that engages a correspondingly shaped shoulder on the upper side of support rings 6 on the preform. Where it is contemplated that the pallet may have to handle preforms with support rings 6 of respectively widely varying dimensions, a different locating and support assembly with a different dimension must be provided for each size to be handled at each station where a preform is to be engaged. As illustrated, there would have to be four locating and support assemblies of each size contemplated. The locating and support assemblies are respectively bolted firmly to the underside of the shuttle by four bolts 45. An aperture 46 extends completely through the ring and is substantially in register with a hole through the web of the shuttle. The locating and support assembly also supports resilient fingers 18 that engage the preform.

Figure 6:
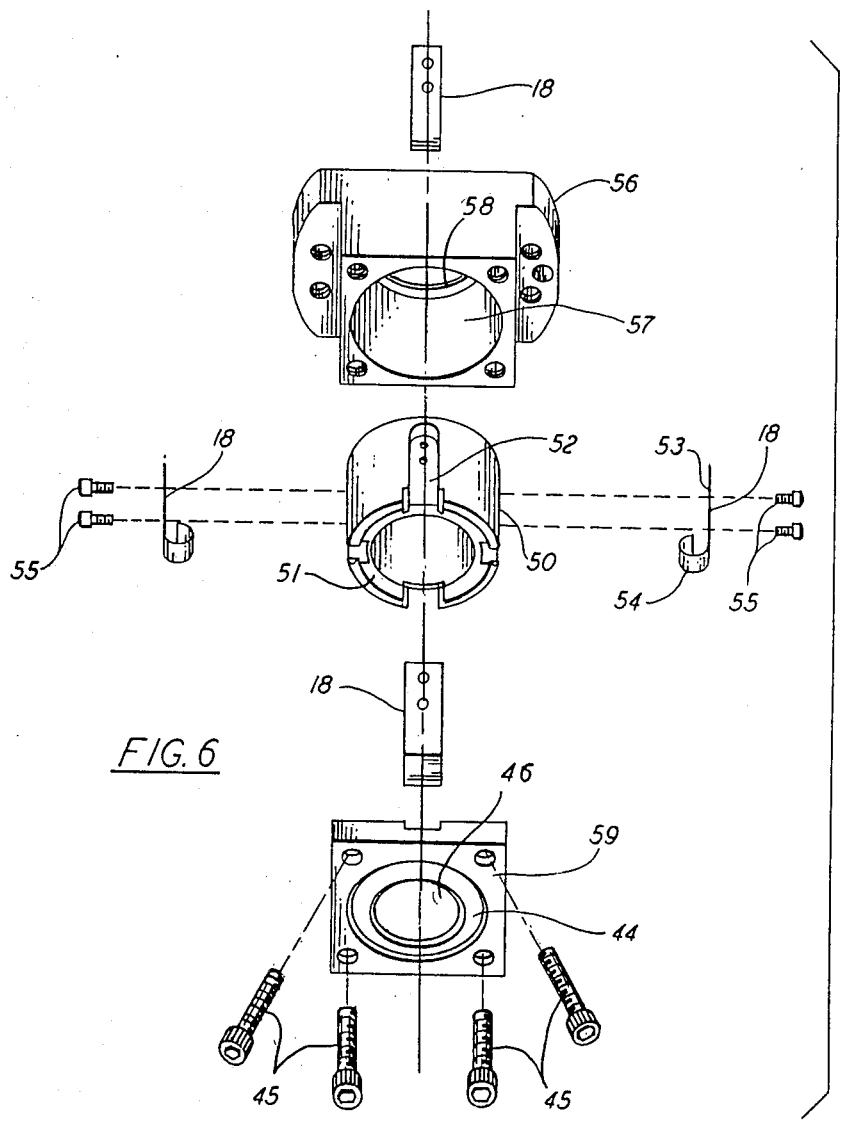
FIG. 6 is an exploded view illustrating the components of the locating and support assembly of FIG. 5.

Each locating and support assembly 15 (see FIGS. 5 & 6) has a gripper spring support ring 50 defining a circular opening 51 to receive the lip 4 of a preform, and gripper spring locating and support surfaces 52 to locate and support four preform gripper springs 53 in a symmetrical circular array around the opening 51 to position looped ends 54 of the springs 53 to resiliently engage the aforementioned annular groove of the preform, when the preform is in the opening 51, thereby to locate and support the preform relative to assembly 15. Each spring 53 is fixedly mounted to the ring 50 by two screws 55 for deformation independently of the other springs 53.

The assembly 15 also has an assembly mounting plate 56 by which the assembly is bolted by bolts 45 to the shuttle 10. Plate 56 defines a central opening 57 dimensioned and shaped to locate and support ring 50 therein between an annular flange 58, which defines an opening, coaxial with opening 51, and a clamp plate 59. Bolts 45 extend through the clamp plate 59 and plate 56 to shuttle 10.

The clamp plate has an inwardly extending annular flange or stop ring 44, defining an opening to permit lip 4 of a preform to pass therethrough into the ring 50. The flange 44 is dimensioned to engage support ring 6 of a preform to locate the preform axially of the assembly 15 (axially being along the axis of the opening 51), and thereby of the shuttle 10, in resilient engagement with the springs 53.

It will be appreciated that the particular structure described for the assembly 15 is not limiting and that the present invention encompasses other resilient structures utilizing independently deformable springs adapted to engage the preform in the desired manner described. Such structures including, for example, annular springs to directly engage the preform and spring arrangements located to cause detents or buffer members to engage a preform as desired. Many similar structures fall within the present invention as will be apparent to a man skilled in the art.

FIG. 1 shows the environment in which the pallet 9 may be and preferably is used. Many of the details are omitted inasmuch as they are already known and are no part of the present invention, indeed some having different inventors.

FIG. 1 illustrates the three most important stations of the operation wherein the pallet is used. These are the left of FIG. 1, a loading station 80 using a so-called picker to pull preforms 1 up into the pallet, a blow molding station, and then a discharge or ejection station.

The preforms 1 are delivered underneath the pallet after being heated to a predetermined temperature in an oven. A machine called a picker 81 is located above the pallet which is to be loaded. The picker heads 87 is driven to reciprocate vertically and is driven down into each preform to engage it. The picker head is basically a cylindrical member having at its end 88 an O-ring around its circumference. The O-ring has a compression fit with the inside of the preform in the neck region. The reciprocating action of the picker drives the plunger down into compression engagement as aforesaid and then reciprocates the picker head with preform attached up into the pallet.

The picker machine comprises a slide member 89 arranged on ways 90 and reciprocated vertically by a rotary actuator 92 which preferably comprises a hydraulic motor turning a crank arm, the end of which works in a slot 93.

The slide 89 has mounted on it a plurality of picker heads 87—illustrated in FIG. 1 as four in number—but in any event corresponding in number to the numbers of preforms to be pulled up into the shuttle. The picker heads are spring biased to their position so that slight overrides at the ends of their stroke are taken up by the springs 95 at the ends.

A pair of spaced apart shot pins 40 engage the locator means. The shot pins are likewise biased as by springs 96 to their positions.

When the rotary actuator drives the slide, the picker heads 87 proceed on through the apertures in the pallet to engage the neck of the respective preforms while at the same time the shot pins 40 have engaged their tapered recesses 13 in the pallet. On the return stroke, the slide 89 moves up carrying with it all the preforms 1 until the latter engage the locating and support assemblies (preforms shoulder 6 engages shoulder 44) where they are wiped off the end of the picker head. Before release from the picker head, however, the preform is brought into locating support engagement with the springs 53.

After the pallet is loaded, it is moved mechanically (the preferred way) or manually to the blow molding station 83. The preforms are moved in a file between open mold halves 95 the pallet 9 is stopped, the mold halves are closed and the blowing operation takes place. After blowing, the molds 95 are opened and the pallet is once again moved (to the right of FIG. 1) to this time carry the blown product out of the mold to the eject position shown at the right of FIG. 1. In this position the blown product is mechanically moved axially of assembly 15 to release the product from the assembly so that it can drop away from the pallet 10. This is achieved by mechanically actuated push rods 96 with resilient members (not shown) in series therewith. These rods 96 are moved downward to engage the neck of the product to push the neck through the spring support of springs 53 so that the product drops free. The pallet is then unhooked at 22 and moved around to the beginning station 80 where the procedure is repeated. As previously explained, the pallet can be loaded and the pallet from which bottles are to be ejected can be moved at right angles to the plane of FIG. 1. For this reason the latch 22, 25, 26 at the end of each pallet is constructed at it is to permit such motion while at the same time providing a "train" of pallets that moves from loading to blowing to unloading.

I claim:

1. A pallet assembly for conveying substantially horizontally a plurality of workpieces each having a circular cross-section from one location through a manufacturing operation to another location comprising the assembly of:
   an elongate pallet shuttle constituting a base on which the other members of the assembly are mounted;
   a plurality of workpiece supporting and locating assemblies supported longitudinally on said shuttle, each of said assemblies further comprising:
   a workpiece support and locating means having resilient means comprising a plurality of spaced apart spring members, each said spring member having a generally vertically extending elongate planar spring portion and a looped end for engaging said workpiece, an area of each said portion, adjacent one end thereof, being secured to said supporting means, said looped end extending from the other end of said portion to engage and resiliently support a workpiece against a stop ring supported on said shuttle to receive, vertically locate and center a workpiece with reference to said shuttle, said ring having an aperture therethrough and a substantially circular locating surface for receiving and locating a matching surface on said workpiece.

2. A pallet assembly according to claim 1 wherein said plurality of vertical spring members are at least three in number and are symmetrically disposed on a spring support member to locate and support a workpiece relative to the pallet assembly.

3. A pallet assembly according to claim 2 wherein there are four said vertical spring members each comprising an integral spring member support tongue and workpiece engaging loop extending from said tongue.

4. A pallet assembly according to claim 3 wherein said locating and support assemblies are disposed closely adjacent said vertical spring member loops.

5. A pallet assembly according to claim 1 comprising guide means mounted substantially laterally of said pallet.

6. A pallet assembly according to claim 1 wherein each said locating and support assembly is secured on said shuttle and has an annular shape with an aperture surrounded by a locating surface, said resilient means being mounted to operate closely adjacent said aperture to hold a workpiece against said locating surface.

7. A pallet assembly according to claim 2 whereing said vertical spring members are rigidly attached to said spring support member.

8. A pallet assembly according to claim 2 wherein said vertical spring members are each independently resiliently deformable.

9. A pallet assembly according to claim 2 wherein said vertical spring members are leaf springs.

* * * * *